(12) United States Patent
Klarer (10) Patent No.: US 7,000,326 B2
(45) Date of Patent: Feb. 21, 2006

(54) APPARATUS AND METHOD FOR MAINTAINING WHEEL ALIGNMENT SENSOR RUNOUT COMPENSATION

(75) Inventor: John D. Klarer, St. Charles, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 10/921,589

(22) Filed: Aug. 19, 2004

(65) Prior Publication Data

US 2005/0016003 A1    Jan. 27, 2005

Related U.S. Application Data

(63) Continuation-in-part of application No. 10/378,305, filed on Mar. 3, 2003, now Pat. No. 6,796,036.

(51) Int. Cl.
*G01B 11/275* (2006.01)
(52) U.S. Cl. .................. 33/203; 33/1 PT; 33/706
(58) Field of Classification Search ................ 33/1 N, 33/1 PT, 203, 203.18, 288, 613, 645, 706, 33/708
See application file for complete search history.

(56) References Cited

U.S. PATENT DOCUMENTS

| | | | |
|---|---|---|---|
| 3,279,084 A | | 10/1966 | Hindin et al. |
| 4,138,825 A | * | 2/1979 | Pelta ......................... 33/203.18 |
| 4,180,915 A | * | 1/1980 | Lill et al. ................. 33/203.19 |
| 4,381,548 A | * | 4/1983 | Grossman et al. ............ 33/288 |
| 4,414,754 A | | 11/1983 | Lapeyre |
| 4,614,041 A | * | 9/1986 | Darton et al. .................. 33/346 |
| 4,879,670 A | * | 11/1989 | Colarelli, III ............ 33/203.18 |
| RE33,144 E | * | 1/1990 | Hunter et al. ............. 33/203.18 |
| 4,953,296 A | * | 9/1990 | Spainhour ................. 33/203.18 |
| 5,052,111 A | * | 10/1991 | Carter et al. ............. 33/203.18 |
| 5,129,725 A | | 7/1992 | Ishizuka et al. |
| 5,152,066 A | | 10/1992 | Rieder et al. |
| 5,442,858 A | | 8/1995 | Wolters et al. |
| 5,598,357 A | * | 1/1997 | Colarelli et al. ............. 700/279 |
| 5,657,544 A | * | 8/1997 | Ota et al. ...................... 33/1 N |
| 5,778,542 A | | 7/1998 | Spoto |
| 6,093,928 A | | 7/2000 | Ohtomo et al. |
| 6,427,346 B1 | * | 8/2002 | Stieff et al. .................... 33/203 |
| 6,470,577 B1 | | 10/2002 | Tondorf et al. |
| 6,574,876 B1 | | 6/2003 | Takeuchi |
| 6,796,036 B1 | * | 9/2004 | Klarer ......................... 33/203 |
| 2002/0020070 A1 | | 2/2002 | Takeuchi |
| 2003/0182800 A1 | | 10/2003 | Sano |

OTHER PUBLICATIONS

GMW "Angular Position Sensing With 2-Axis Hall ICs", AN-101, Mar. 11, 2003 pp. 7.
SENTRON "Integrated 2-Axis Hall Sensor", 2SA-10, Apr. 2003.

* cited by examiner

*Primary Examiner*—G. Bradley Bennett
(74) *Attorney, Agent, or Firm*—Polster, Lieder, Woodruff & Lucchesi, L.C.

(57) ABSTRACT

A vehicle wheel alignment sensor unit is configured with an absolute rotational position sensor to provide an absolute rotational position of a mounting shaft relative to the vehicle wheel alignment sensor unit enabling resumption of operation and recall of stored runout data subsequent to an operational disruption such as a system power loss. An internal power source maintains the integrity of the sensor memory for a definite span of time during momentary system power losses such as battery changes or during overnight shutdowns, permitting the mounting shaft runout compensation values to be maintained and utilized upon the restoration of system power.

19 Claims, 7 Drawing Sheets

APPARATUS AND METHOD FOR MAINTAINING WHEEL ALIGNMENT SENSOR RUNOUT COMPENSATION

CROSS-REFERENCE TO RELATED APPLICATIONS

The present application is a continuation-in-part of U.S. patent application Ser. No. 10/378,305 filed on Mar. 3, 2003 now U.S. Pat. No. 6,796,036, herein incorporated by reference, and from which priority is claimed.

STATEMENT REGARDING FEDERALLY SPONSORED RESEARCH

Not Applicable.

BACKGROUND OF THE INVENTION

The present invention relates generally to vehicle wheel alignment sensors of the type which are pendulously secured to a vehicle wheel by a mounting shaft during a vehicle wheel alignment procedure, and in particular, to an apparatus and method for identifying and maintaining tracking of an absolute mounting shaft rotational position of the vehicle wheel alignment sensor after mounting to a vehicle wheel.

Computer controlled vehicle wheel alignment systems, such as those shown in U.S. Reissue Pat. No. 33,144 to Hunter et al., U.S. Pat. No. 4,381,548 to Grossman et al., and U.S. Pat. No. 5,598,357 to Colarelli et al., utilize a number of wheel-mounted alignment sensors, such as those described in U.S. Pat. No. 4,879,670 to Colarelli, to obtain measurements related to vehicle wheel alignment parameters. The majority of vehicle wheel alignment sensors currently utilized in the market are "cordless", relying on internal rechargeable batteries to power associated circuitry, and communicating to a console wheel alignment computer using conventional wireless communications technology. One example of a conventional computer controlled vehicle wheel alignment system is the Series 811 console, which utilizes the DSP-500 series cordless vehicle wheel alignment sensors, and is sold by Hunter Engineering Company of Bridgeton, Mo.

It is known in the industry that vehicle wheel alignment sensors which are pendulously secured to individual vehicle wheels must be compensated for any runout present between a plane in which the vehicle wheel alignment sensor hangs, and a plane perpendicular to the rotational axis of the wheel. The preferred procedures for obtaining runout compensation generally involve mounting a vehicle wheel alignment sensor to a vehicle wheel using a wheel clamp, rotating the wheel and mounting shaft to three distinct rotational positions relative to the sensor housing, and obtaining sensor readings for each position. Using the three sensor readings, a sinusoidal pattern representative of the amount of runout present between the vehicle wheel alignment sensor and the vehicle wheel may be calculated for any rotational position of the vehicle wheel and/or sensor. This runout compensation procedure for a vehicle wheel alignment sensor is described in detail in U.S. Pat. No. 5,052,111 to Carter et al.

Once the runout compensation procedure has been successfully completed, the vehicle wheel alignment sensor establishes a relative base rotational position of the mounting shaft. Utilizing an inexpensive relative rotational position sensor, the vehicle wheel alignment sensor tracks the rotation of the mounting shaft relative to the base rotational position. By tracking the change in the rotational position of the vehicle wheel alignment sensor from the base position, a runout compensation value for the current rotational position of the vehicle wheel alignment sensor is calculated from the previously obtained sinusoidal pattern.

One drawback to using inexpensive relative rotational position sensors is an inability of the sensor to identify an absolute rotational position of the vehicle wheel alignment sensor if the established base rotational position is lost. The established base rotational position in a conventional vehicle wheel alignment sensor can become lost for a number of reasons. For example, if the rechargeable batteries supplying power to maintain the wheel alignment sensor memory fail, or require replacement or recharging, data stored in the memory such as the established base rotational position and sinusoidal pattern will be lost, requiring an operator to repeat the time consuming compensation procedure before vehicle wheel alignment can be resumed. Similarly, in rare cases, battery supplied power can be lost momentarily due to poor or unclean battery contacts.

Even if the data values are stored in a persistent memory, such as one receiving power from a capacitor, which will maintain the data values for a limited period of time until the restoration of the normal power supply, any relative rotational movement between the vehicle wheel alignment sensor, mounting shaft, or vehicle wheel will not be recorded by the relative rotational position sensor, resulting in a discrepancy between the rotational position in which the sensor was compensated, and the current rotational position as identified by the relative rotational position sensor upon restoration of power. Finally, if an operator desires to suspend work on a vehicle in the middle of a vehicle wheel alignment procedure, and shuts down the alignment system (such as overnight), the stored data may be lost, and any rotational movement of the mounting shaft relative to the vehicle wheel alignment sensor will not be tracked, requiring the runout compensation procedures to be repeated upon the subsequent system startup.

It is known that an absolute rotational position sensor which relies upon unique identification markings associated with the mounting shaft to identify the current absolute rotational position of a fixed point on the mounting shaft relative to the vehicle wheel alignment sensor may be utilized in place of the relative rotational position sensor in a cordless vehicle wheel alignment sensor. However, to align modern vehicles, a very high degree of precision is required in the sensor rotational position measurements. When utilizing an absolute rotational position sensor in such a high precision environment, the conventional absolute rotational position sensor must be capable of identifying rotational positions to the same degree of accuracy, and therefore requires a number of unique markings proportional to the required degree of accuracy. Absolute rotational position sensors with unique markings on the mounting shaft which are capable of measuring rotational positions to the required accuracy levels for vehicle wheel alignment are delicate and costly items, and are generally unsuited for use in a vehicle service environment.

Accordingly, there is a need in the industry for an alternative device and method for maintaining cordless vehicle wheel alignment sensor runout compensation values and rotational positions following momentary or extended losses of power, which do not rely upon the use of delicate and costly absolute rotational position sensors with associated markings on the mounting shaft of the vehicle wheel alignment sensor.

BRIEF SUMMARY OF THE INVENTION

Briefly stated, an apparatus of the present invention incorporated into a conventional cordless vehicle wheel alignment sensor consists of a two-axis Hall-effect sensor disposed to provide non-contact sensing of an absolute rotational position of the mounting shaft relative to the vehicle wheel alignment sensor. The two-axis Hall-effect sensor is secured coaxially adjacent an axial end of the mounting shaft of the vehicle wheel alignment sensor. A permanent magnet is disposed on the axial end of the mounting shaft. Signals from the two-axis Hall-effect sensor generated as the poles of the permanent magnet rotate about the axis of the mounting shaft are conveyed to a sensor processor and utilized to store, in a sensor memory area, one or more absolute mounting shaft rotational positions. An internal power source, such as a capacitor maintains the integrity of the sensor memory for a definite span of time during momentary power losses such as battery changes or during overnight shutdowns, permitting the mounting shaft runout compensation values to be maintained and reutilized upon the restoration of system power, without the need to repeat the runout compensation procedures.

In an alternate embodiment, an apparatus of the present invention incorporated into a conventional cordless vehicle wheel alignment sensor consists of a pair of two-axis Hall-effect sensors each disposed to provide non-contact sensing of an absolute rotational position of the mounting shaft relative to the vehicle wheel alignment sensor. A first two-axis Hall-effect sensor is secured coaxially adjacent an axial end of the mounting shaft of the vehicle wheel alignment sensor. A permanent magnet is disposed on the axial end of the mounting shaft. Signals from the two-axis Hall-effect sensor generated as the poles of the permanent magnet rotate about the axis of the mounting shaft are conveyed to a sensor processor and utilized to store, in a sensor memory area, one or more coarse absolute mounting shaft rotational positions. The second two-axis Hall-effect sensor is secured adjacent an annular arrangement of permanent magnets secured about the mounting shaft. Signals from the second two-axis Hall-effect sensor generated as the poles of the annular arrangement of permanent magnets rotate about the axis of the mounting shaft are conveyed to a sensor processor and utilized to store, in a sensor memory area, one or more fine absolute mounting shaft rotational positions. An internal power source, such as a capacitor maintains the integrity of the sensor memory for a definite span of time during momentary power losses such as battery changes or during overnight shutdowns, permitting the mounting shaft runout compensation values to be maintained and reutilized upon the restoration of system power, without the need to repeat the runout compensation procedures.

As a method, the present invention requires a vehicle wheel alignment sensor which has been previously mounted to a vehicle wheel and compensated for runout. To restore or identify an absolute rotational position of the mounting shaft relative to the vehicle wheel alignment sensor, the wheel alignment sensor is rotated about the mounting shaft through at least an arc sufficient to provide a measurable change in a magnetic field associated with the two-axis Hall-effect sensor, to identify the current absolute rotational position of the vehicle wheel alignment sensor mounting shaft. The current absolute rotational position is then utilized to determine the associated runout compensation value for the current sensor rotational position, using data stored in a persistent sensor memory during a runout compensation procedure, thereby permitting an operator to return the vehicle wheel alignment sensor to a previous rotational position or utilize stored runout compensation data following a general power-down or momentary power loss, such as battery contact failure or during battery replacement or recharging.

An alternate method, the present invention requires a vehicle wheel alignment sensor which has been previously mounted to a vehicle wheel and compensated for runout. To restore or identify an absolute rotational position of the mounting shaft relative to the vehicle wheel alignment sensor, the wheel alignment sensor is rotated about the mounting shaft through at least an arc sufficient to provide a measurable change in a magnetic field associated with the two-axis Hall-effect sensor disposed coaxial with the mounting shaft, to identify a course absolute rotational position of the mounting shaft. Simultaneously, a fine absolute rotational position of the vehicle wheel alignment sensor mounting shaft is acquired by a second two-axis Hall-effect sensor disposed adjacent the mounting shaft. The current coarse and fine absolute rotational positions are utilized to determine the associated runout compensation value for the current sensor mounting shaft rotational position, using data stored in a persistent sensor memory during a runout compensation procedure, thereby permitting an operator to return the vehicle wheel alignment sensor to a previous rotational position or utilize stored runout compensation data following a general power-down or momentary power loss, such as battery contact failure or during battery replacement or recharging.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
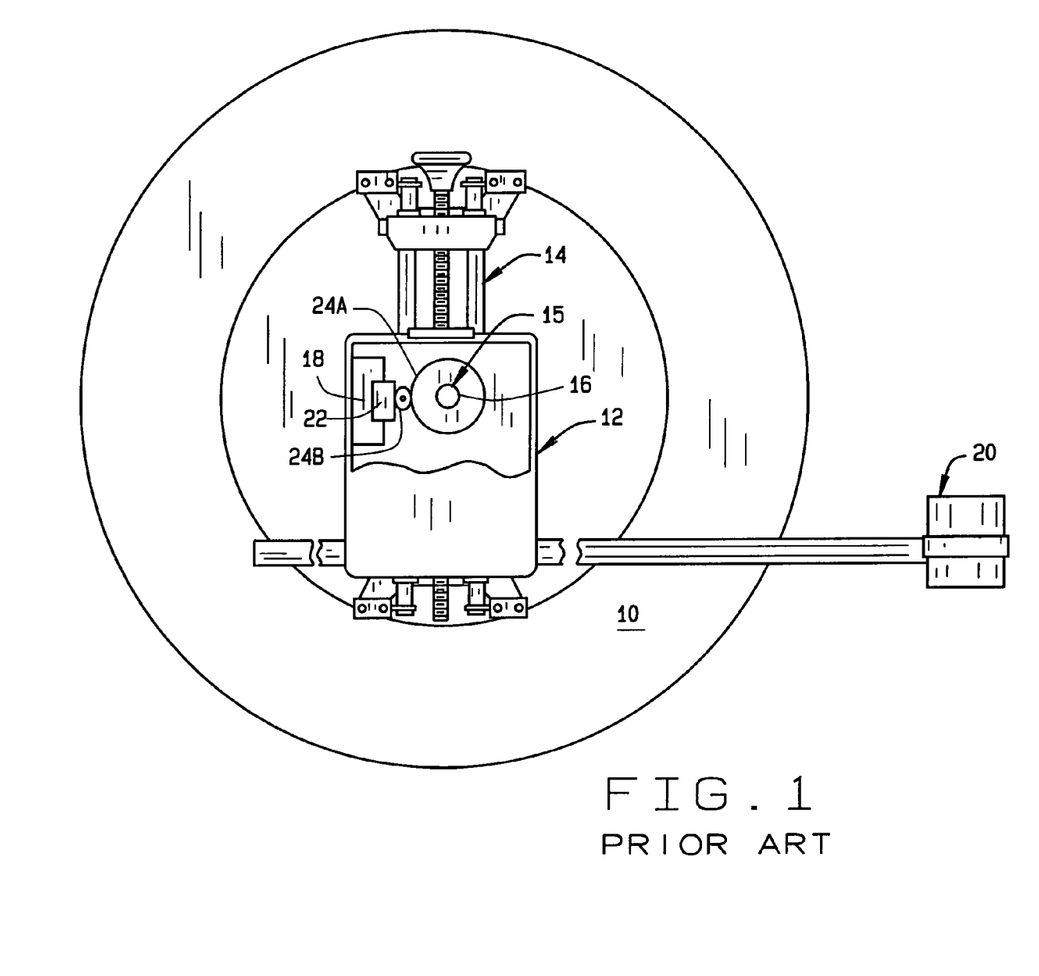
FIG. 1 is a side view in schematic form of a vehicle wheel together with a prior art cordless vehicle wheel alignment sensor mounted pendulously to the wheel.

Referring to FIG. 1, there is shown a vehicle wheel 10 of an automotive vehicle, to which a vehicle wheel alignment sensor unit 12 is mounted by means of a suitable conventional wheel clamp 14. The wheel alignment sensor unit 12 is pendulously mounted to the wheel 10 through wheel clamp 14 on a mounting shaft 15 so as to swing freely about an axis which is approximately coaxial with the axis of rotation 16 of the wheel 10. The sensor unit 12 carries a first angle sensor 18 which develops an electric signal representative of the angular position of the sensor unit 12 relative to the vertical plane. A second angle sensor 20, also carried by the sensor unit 12, develops an electric signal representative of the angular position of the sensor unit 12 relative to the horizontal plane. The angle sensors 18 and 20 are conventional in the wheel alignment art for making camber and toe measurements, and additional sensors (not shown) are commonly carried by the sensor unit 12 for making other angle measurements used in the alignment of the wheels of a vehicle.

Figure 2:
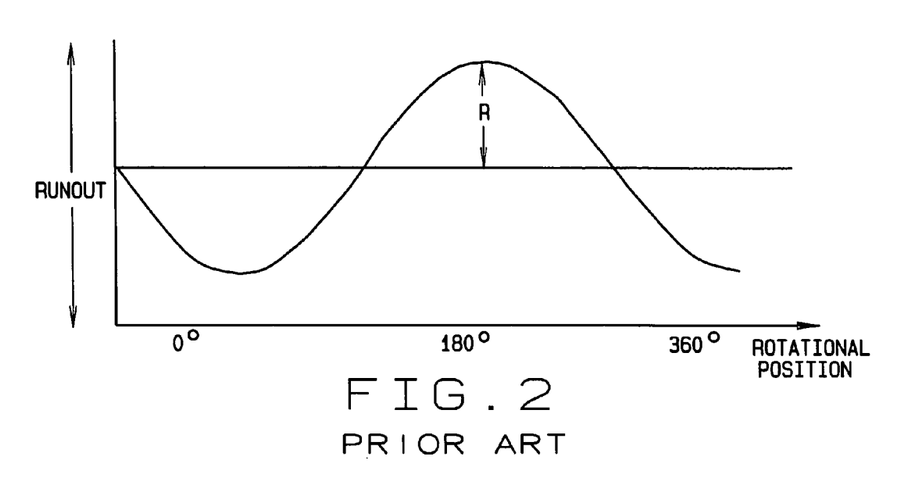
FIG. 2 is an exemplary illustration of the sinusoidal waveform of the runout of the vehicle wheel and alignment sensor shown in FIG. 1 in the toe plane.

It is well known that any wobble of the wheel 10 or of the sensor unit 12 during rotation about the axis of rotation affects the measurements made by the angle sensor 18 and 20. As can be seen in FIG. 2, wobble or runout present may be represented as a sinusoidal waveform, where the amplitude of the waveform at a given rotational position of the wheel and/or sensor represents the amount of runout present at that rotational position. It is necessary, therefore, either to eliminate the wobble or runout, or to compensate for it. Since in many cases it is impractical to eliminate the wobble, the usual practice is to compensate the acquired toe angle and camber angle measurements to correct for the wobble or runout at a corresponding rotational position at which the measurement was acquired. A suitable method for calculating and utilizing runout present at each rotational position is described in U.S. Pat. No. 5,052,111 to Carter, et al.

Figure 3:
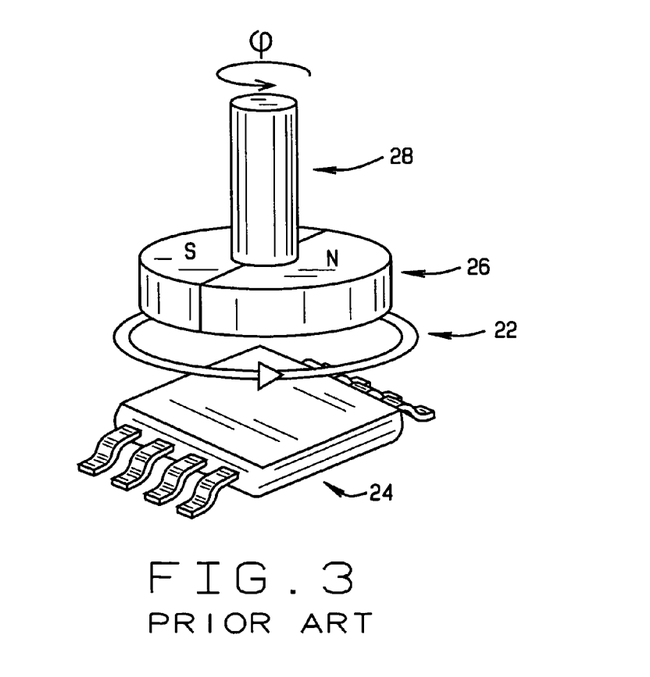
FIG. 3 is a perspective illustration of a prior art two-axis Hall-Effect sensor and associated rotating permanent magnet.
Figure 4:
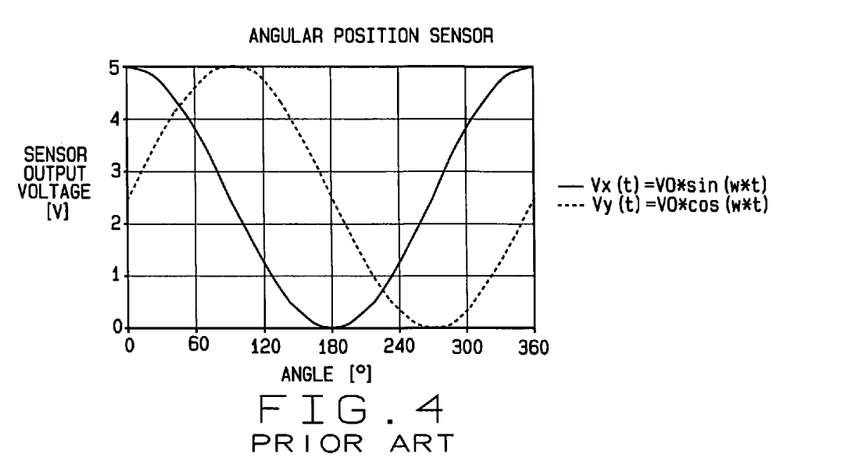
FIG. 4 is a graphical representation of voltages generated in the two-axis Hall-Effect sensor of FIG. 3 by the rotation of the permanent mag

Turning to FIG. 3, an absolute rotational position sensor assembly 22 is illustrated generally. The absolute rotational position sensor assembly 22 includes a two-axis Hall Effect sensor 24 disposed coaxially about an axis $\phi$ with a single pole pair magnet 26 coupled to a rotating shaft 28. The magnet 26 is magnetized diametrically, so that by rotating the shaft 28, the magnetic field generated by the magnet 26 also rotates. The rotation of the magnetic field through the two-axis Hall Effect sensor 24 results in two generated voltages, Vx and Vy, which represent the sine and cosine of the magnetic field direction. As shown in FIG. 4, calculating a ratio of Vx to Vy yields a representation of the rotational position of the rotating shaft 28 relative to the two-axis Hall Effect sensor 24 from an initial position, i.e. provides an absolute rotational position of the rotating shaft 28. A suitable two-axis Hall Effect sensor is available from Sentron AG, of Zug, Switzerland, or GMW of San Carlos, Calif., and sold under the product identification 2SA-10.

Figure 5:
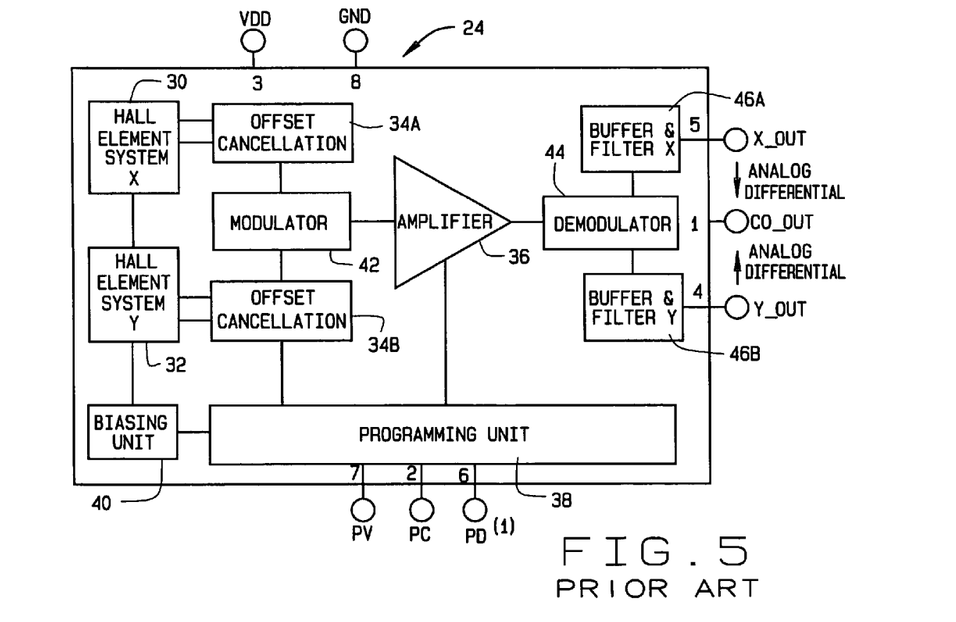
FIG. 5 is a block diagram of the components of the prior art two-axis Hall-Effect sensor of FIG. 3.

As shown in FIG. 5, the two-axis Hall Effect sensor 24 preferably includes an X-axis Hall effect sensor 30, a Y-axis Hall effect sensor 32, a pair of offset cancellation circuits 34A, 34B, amplification circuits 36. Programming circuits 38 are provided for enabling and setting a bias circuit 40 for the Hall effect sensors, offset parameters, and amplification parameters. Preferably, signals from the Hall effect sensors 30, 32 are routed through the offset cancellation circuits 34A, 34B and modulated in a modulator circuit 42 prior to amplification. After the modulated signal is amplified, a demodulator circuit 44 separated the corresponding X and Y axis signal, which are then routed through corresponding filters and buffering circuits 46A, 46B for output.

Input signals to the two-axis Hall Effect sensor 24 shown in FIG. 5 include a supply voltage (VDD), a supply ground (GND), a clock signal (PC), a programming voltage signal (PV), and a programming data signal (PD). Output signals include a common output signal (CO_OUT), an X-channel analog output (X_OUT), and a Y-channel analog output (Y_OUT).

Those of ordinary skill in the art will recognize that the two-axis Hall Effect sensor 24 may be implemented as an integrated circuit component, or as two discrete Hall Effect sensors mounted in suitable configuration to provide sine and cosine representative values of the rotating magnetic fields. Optionally, a single Hall Effect sensor may be employed to provide 180° of rotational resolution, combined with a suitable mechanism to identify within which half-circle of a complete rotation of the mounting shaft the rotational position measurement has been acquired.

Figure 6:
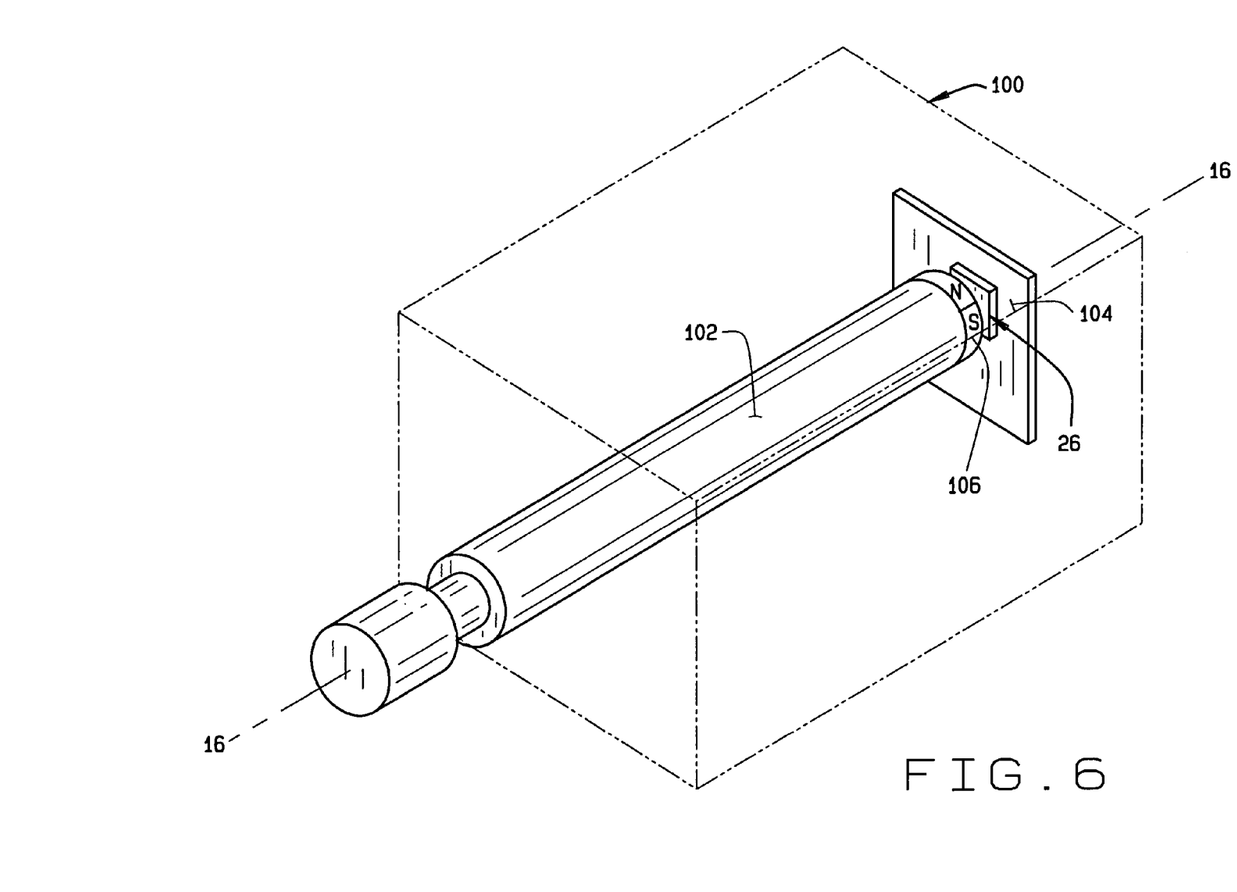
FIG. 6 is a perspective illustration of a vehicle wheel alignment sensor of the present invention incorporating a two-axis Hall-Effect sensor for obtaining absolute rotational position measurement.

Turning to FIG. 6, a vehicle wheel alignment sensor unit 100 of the present invention is shown with an absolute rotational position sensor assembly 22 operatively associated with an alignment sensor mounting shaft 102. Housing components which surround and support the mounting shaft 102, and which comprise the body of the vehicle wheel alignment sensor unit 100 are shown in phantom in FIG. 6 for purposes of clarity. The absolute rotational position sensor assembly 22 is disposed on a supporting structure 104 coaxial with, and adjacent an end of, the mounting shaft 102.

A magnet 106 which is magnetized across a diameter is disposed on the end of the mounting shaft 102, parallel to the absolute rotational position sensor assembly 22, such that rotation of the mounting shaft 102 will result in a corresponding rotation of the magnet 106 and an associated magnetic field.

Figure 7:
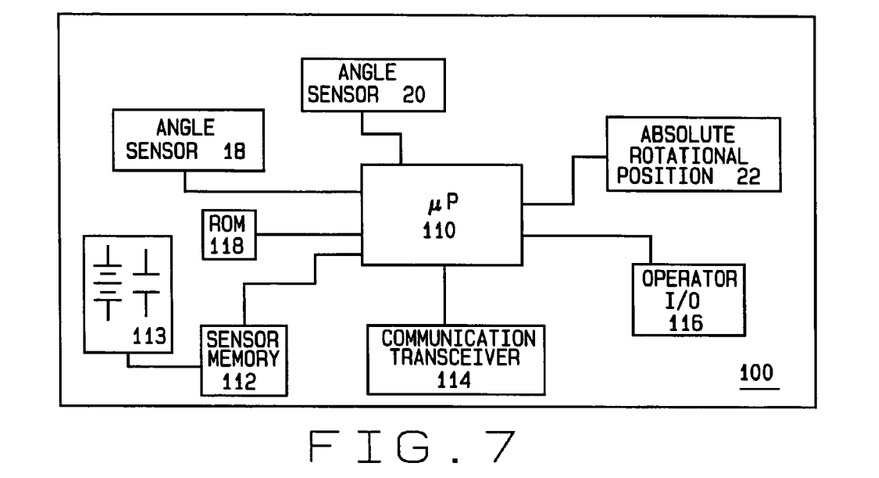
FIG. 7 is a block diagram representation of the logic circuits of a vehicle wheel alignment sensor of the present invention.

As shown in FIG. 7, output signals from the absolute rotational position sensor assembly 22 are routed to a micro-processor or logic circuit 110 in the vehicle wheel alignment sensor unit 100. In addition to receiving signals from the absolute rotational position sensor assembly 22, the micro-processor or logic circuit 110 is configured to communicate with the conventional components of the wheel alignment sensor unit 100. These include the angle sensors 18 and 20, a sensor memory 112, a communications transceiver 114, such as a radio-frequency or infra-red communications unit, and one or more conventional operator I/O devices 116 such as buttons or LEDs disposed on the wheel alignment sensor unit 100. The sensor memory 112 is preferably linked to a short-term power supply 113, such as an internal battery or a super-capacitor, capable of providing sufficient power to maintain stored data in the sensor memory 112 during interruption or shutdown of a normal power supply (not show). Alternatively, sensor memory 112 may be a form of re-writable persistent memory, such as MRAM, which does not require a continuous supply of power to maintain stored data values.

In addition to being configured to perform the conventional functions of a vehicle wheel alignment sensor, the micro-processor or logic circuit 110 is configured to utilize the signals received from the absolute rotational position sensor assembly 22 to identify an absolute rotational position of the mounting shaft 102 relative to the vehicle wheel alignment sensor unit 100. The absolute rotational position sensor 22 provides two pieces of information to the micro-processor or logic circuit 110, a rotational distance and a direction of rotation. Using a known or identified mounting shaft parameter correlated with one or more absolute rotational positions stored in a persistent sensor memory 118 such as an ROM, EPROM, or EEPROM, the micro-processor or logic circuit 110 determines an absolute rotational position of the mounting shaft 102 relative to the vehicle wheel alignment sensor unit 100 and the vehicle wheel 10, or to a vertical (gravity) orientation. Subsequent rotation of the mounting shaft 102 relative to the vehicle wheel alignment sensor unit 100 is tracked in a conventional manner by the micro-processor or logic circuit 110 using signals received from the absolute rotational position sensor 22, once the initial absolute rotational position has been identified.

During use, a vehicle wheel alignment sensor unit 100 incorporating the absolute rotational position sensor assembly 22 of the first embodiment is secured to a vehicle wheel, such as through the use of a wheel clamp 14. Prior to the obtaining the first vehicle wheel alignment measurements, the vehicle wheel alignment sensor unit 100 must be compensated for any runout or wobble present in the mounting to the vehicle wheel 10. A runout compensation procedure is completed, and data representative of, or sufficient to reconstruct, a sinusoidal pattern of runout present for a complete rotation about the mounting shaft 102 is obtained and stored in the sensor memory 112.

As previously described, to compensate a vehicle wheel alignment measurement for runout between the vehicle wheel alignment sensor unit 100 and the vehicle wheel 10, it is necessary to know the rotational position of one relative to the other about the mounting shaft 102, as well as the corresponding runout value for that rotational position. Upon completion of the runout compensation procedure, the micro-processor or logic circuit 110 continuously tracks all subsequent rotational movements of the mounting shaft 102 relative to the vehicle wheel alignment sensor unit 100 through signals obtained from the absolute rotational position sensor 22. In addition, upon completion of the runout compensation procedure, the absolute rotational position sensor assembly 22 of the present invention is utilized by the micro-processor or logic circuit 110 to identify an absolute rotational position RC1 of the vehicle wheel alignment sensor unit 100 associated with at least one point on the runout compensation sinusoidal waveform. Position RC1 is stored in the sensor memory 112, together with sufficient information to reconstruct the runout sinusoidal waveform for each rotational position of the vehicle wheel alignment sensor unit 100.

Upon restoration of power following an interruption in power supplied to the vehicle wheel alignment sensor unit 100, such as may be caused by a battery discharge, poor electrical contact with the battery leads, or an intentional operator shutdown while in use, which results in a discontinuity in the tracking of the rotational movements or position of the mounting shaft 102 relative to the wheel alignment sensor unit 100, the micro-processor or logic circuit 110 is configured to utilize the data stored in the sensor memory 112, together with a new absolute rotational position measurement, to resume normal sensor operation without the need to repeat the runout compensation procedures.

Assuming that the vehicle wheel alignment sensor unit 100 has not been dismounted from the vehicle wheel 10 during the interruption in power or shutdown, the runout compensation values previously obtained and stored in the sensor memory 112 remain valid for all rotational positions of the vehicle wheel alignment sensor unit 100. What is unknown immediately after restoration of the power or restart of the system is, the current rotational position of the mounting shaft 102 relative to the vehicle wheel alignment sensor unit 100. For example, it is possible that the mounting shaft 102 was rotated relative to the vehicle wheel alignment sensor unit 100 during the time the power was interrupted, or the vehicle wheel 10 was rolled forward or backwards.

To re-synchronize the current rotational position of the vehicle wheel alignment sensor unit 100 and the stored runout compensation values, the micro-processor or logic circuit 110 is configured to utilize the absolute rotational position sensor assembly 22 of the present invention to obtain a current absolute rotational position RC2 for the vehicle wheel alignment sensor unit 100. Once the current absolute rotational position RC2 of the mounting shaft 102 relative to the vehicle wheel alignment sensor unit 100 is obtained by the micro-processor or logic circuit 110, the current absolute rotational position RC2 is utilized together with the stored data representative of the sinusoidal runout pattern and previous absolute rotational position RC1 to re-synchronize the rotation of the mounting shaft 102 relative to the vehicle wheel alignment sensor unit 100 with the previously determined runout compensation sinusoidal waveform. Subsequent rotation of the mounting shaft 102 relative to the vehicle wheel alignment sensor unit 100 is tracked by the absolute rotation position sensor 22, and an associated runout compensation value obtained by the micro-processor or logic circuit 110 using the stored runout sinusoidal waveform data.

Using the absolute rotational position sensor assembly 22 of the present invention further permits the micro-processor or logic circuit 110 to identify a specific or predetermined absolute rotational position of the mounting shaft 102, such as a "zero" position, "gravity referenced" position, or other operator identified rotational position, and to guide an operator to return the vehicle wheel alignment sensor unit 100 to the identified absolute rotational position at any point during a vehicle wheel alignment procedure, including subsequent to a loss of power to the vehicle wheel alignment sensor unit 100 or system shut down.

Figure 8:
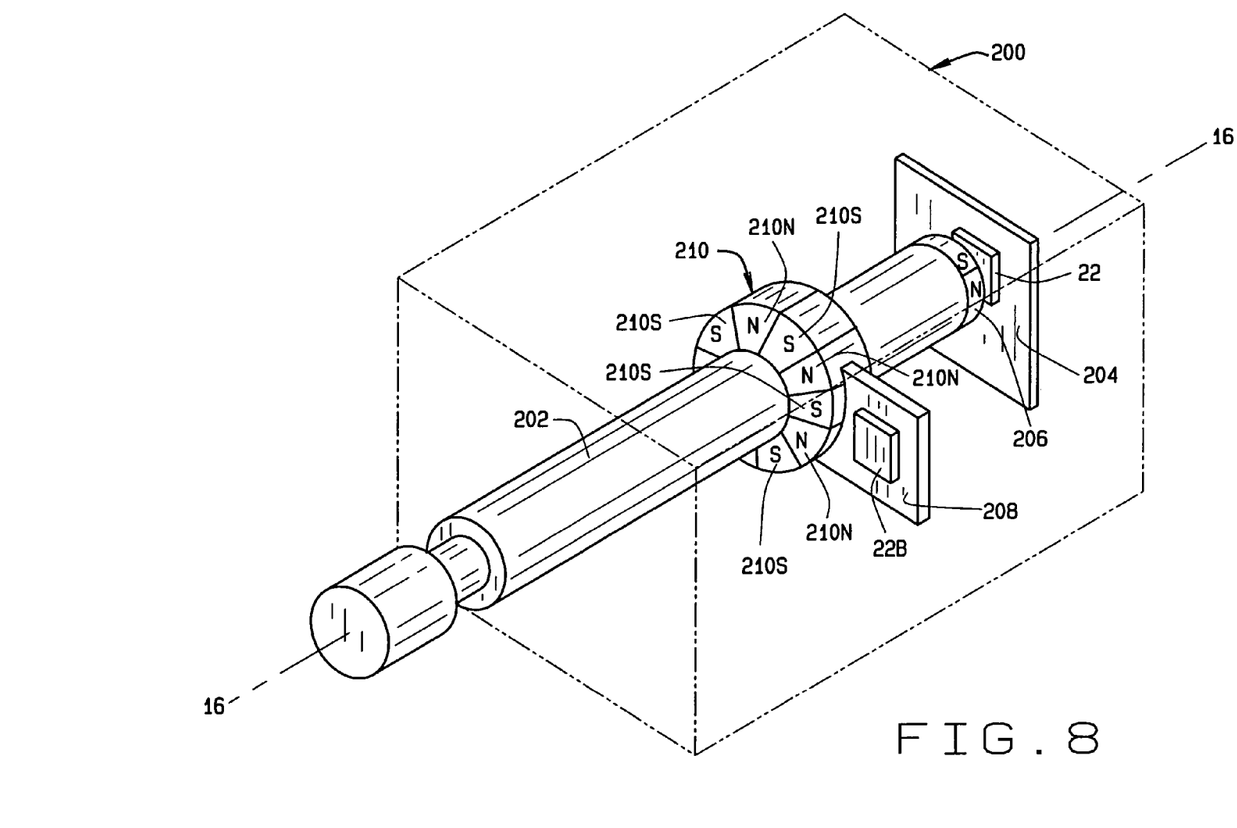
FIG. 8 is a perspective illustration of an alternate embodiment vehicle wheel alignment sensor of the present invention, incorporating a pair of two-axis Hall-Effect sensors for obtaining absolute rotational position measurements with a fine degree of precision.

Turning to FIG. 8, an alternate embodiment vehicle wheel alignment sensor unit 200 of the present invention is shown with a pair of absolute rotational position sensor assemblies 22A and 22B for providing increased absolute rotational position measurements. The first absolute rotational position sensor assembly 22A is operatively disposed adjacent to, and coaxial with, and end of the mounting shaft 202 of the vehicle wheel alignment sensor unit 200. The second absolute rotational position sensor assembly 22B is operatively disposed parallel to, and adjacent, the mounting shaft 202. Housing components which surround and support the mounting shaft 202, and which comprise the body of the vehicle wheel alignment sensor unit 200 are shown in phantom in FIG. 8 for purposes of clarity.

The first absolute rotational position sensor assembly 22A is disposed on a supporting structure 204 coaxial with, and adjacent an end of, the mounting shaft 202. A magnet 206 which is magnetized across a diameter is disposed on the end of the mounting shaft 202, parallel to the absolute rotational position sensor assembly 22A, such that rotation of the mounting shaft 202 will result in a corresponding rotation of the magnet 206 and an associated magnetic field.

The second absolute rotational position sensor assembly 22B is disposed on a second supporting structure 208 oriented adjacent to, and perpendicular with, the axis 16 of the mounting shaft 202. An annular magnet 210 is fixed about the mounting shaft 202, coplanar with the second absolute rotational position sensor assembly 22B on the second supporting structure 208. The annular or ring magnet 210 includes four or more equally spaced pole pairs 210N, 210S. Rotation of the mounting shaft 202 will result in a corresponding rotation of the ring magnet 210 about the axis 16 and the oscillation of an associated magnetic field at the location of the second absolute rotational position sensor assembly 22B. The oscillations of the magnetic field associated with the annular magnet 210 results in "n" electrical cycles of sine and cosine voltage signals from the second absolute rotational position sensor assembly 22B, where "n" is the number of pole pairs 210N, 210S in the annular magnet 210.

Figure 9:
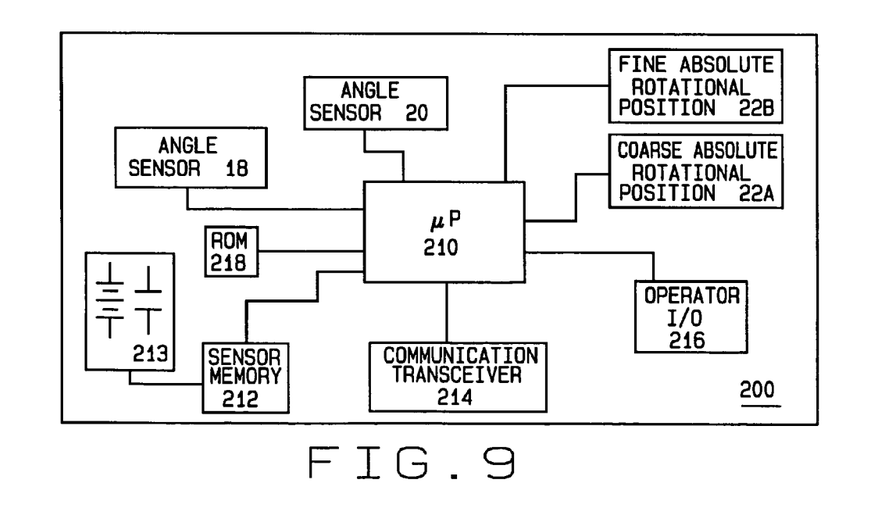
FIG. 9 is a block diagram representation of the logic circuit of an alternate embodiment vehicle wheel alignment sensor of the present invention adapted to provide coarse and fine rotational position measurements.

As shown in FIG. 9, output signals from the first and second absolute rotational position sensor assemblies 22A and 22B are routed to a micro-processor or logic circuit 211 in the vehicle wheel alignment sensor unit 200. Output signals from the first absolute rotational position sensor assembly 22A provide one cycle of sine and cosine voltage signals per rotation of the mounting shaft 202, identical to the operation of absolute rotational position sensor assembly 22 as previously described in connection with embodiment 100. In contrast to the output signals from the second absolute rotational position sensor assembly 22B, the output signals from the first sensor assembly 22A are considered "coarse" rotational position measurements. The "coarse" rotational position measurement is utilized by the logic circuit or micro-processor 211 to identify which pole pair 210N, 210S of the ring magnet 210 is currently disposed adjacent to the second absolute rotational position sensor assembly 22B.

Figure 10:
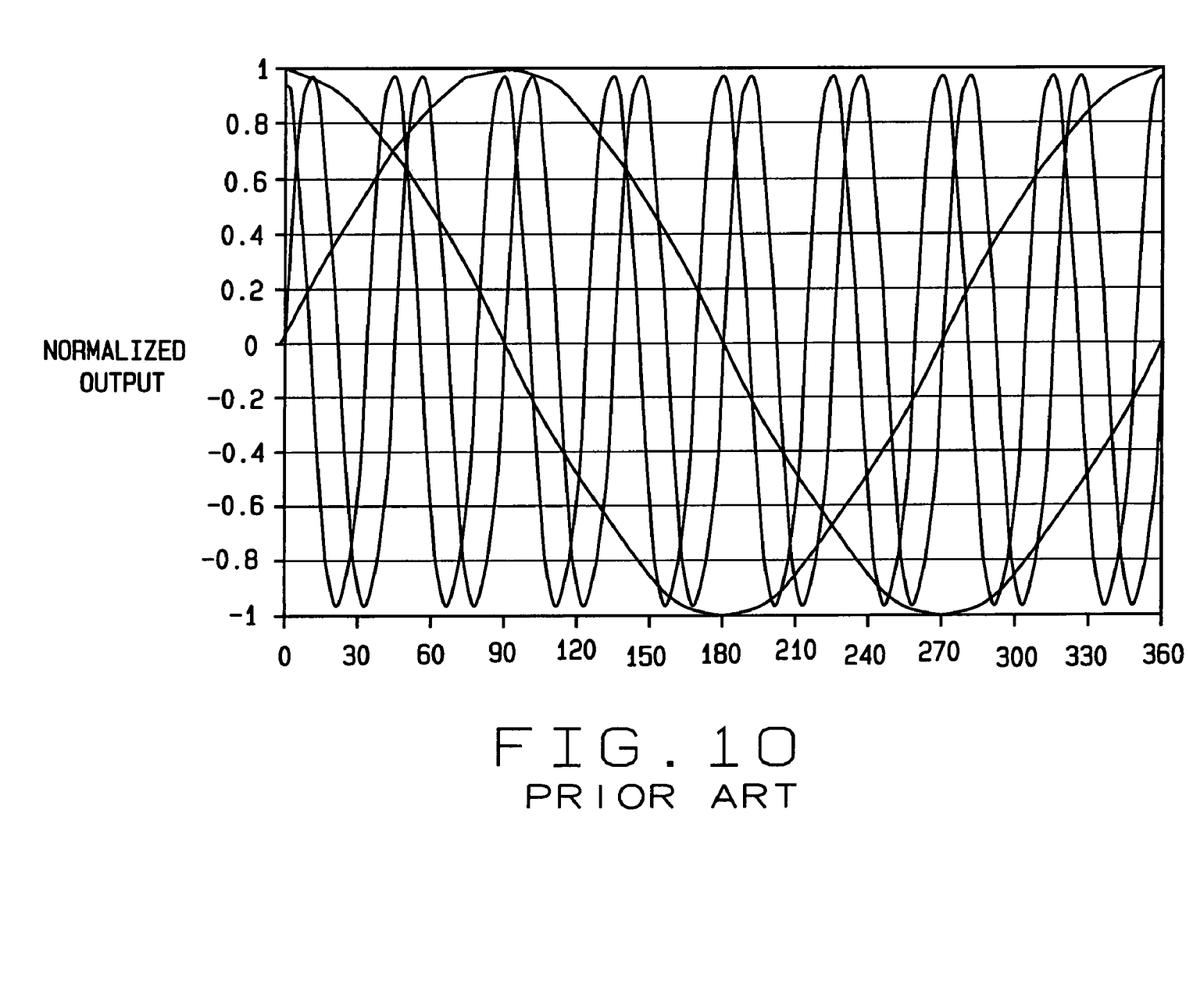
FIG. 10 is a graphical representation of an exemplary prior art output of a pair of two-axis Hall-Effect sensors for obtaining absolute rotational position measurements with a fine degree of precision.

Since each pole pair 210N, 210S of the annular or ring magnet 210 is equally sized and spaced, i.e. occupies an equal arc about the circumference of the annular or ring magnet 210, identification of a single pole pair 210N, 210S identifies a arcuate range within which the rotational position of the mounting shaft 202 is currently disposed. Output signals from the second absolute rotational position sensor assembly 22B may then be used to identify a highly accurate or "fine" rotational position of the mounting shaft 202 within the "coarse" arcuate range (360°/n) identified by the output signals from the first absolute rotational position sensor assembly 22A. The degree of accuracy within the "fine" range is limited to the measurement precision of the second absolute rotational position sensor assembly 22B. Exemplary output signals from the pair of absolute rotational position sensor assemblies 22A and 22B are shown in FIG. 10.

In addition to receiving signals from each absolute rotational position sensor assembly 22A, 22B, the micro-processor or logic circuit 211 is configured to communicate with the conventional components of the wheel alignment sensor unit 200. These include the angle sensors 18 and 20, a sensor memory 212, a communications transceiver 214, such as a radio-frequency or infra-red communications unit, and one or more conventional operator I/O devices 216 such as buttons or LEDs disposed on the wheel alignment sensor unit 200. The sensor memory 212 is preferably linked to a short-term power supply 213, such as an internal battery or a super-capacitor, capable of providing sufficient power to maintain stored data in the sensor memory 212 during interruption or shutdown of a normal power supply (not show). Alternatively, sensor memory 212 may be a form of re-writable persistent memory, such as MRAM, which does not require a continuous supply of power to maintain stored data values.

In addition to being configured to perform the conventional functions of a vehicle wheel alignment sensor, the micro-processor or logic circuit 211 is configured to utilize the signals received from the absolute rotational position sensor assemblies 22A and 22B to identify a high precision absolute rotational position of the mounting shaft 202 relative to the vehicle wheel alignment sensor unit 200. Using a known or identified mounting shaft parameter correlated with one or more absolute rotational positions stored in a persistent sensor memory 218 such as an ROM, EPROM, or EEPROM, the micro-processor or logic circuit 211 determines an absolute rotational position of the mounting shaft 202 relative to, the vehicle wheel alignment sensor unit 200 and the vehicle wheel 10, or to a vertical (gravity) orientation, to a high degree of precision. Subsequent rotation of the mounting shaft 202 relative to the vehicle wheel alignment sensor unit 200 is tracked in a conventional manner by the micro-processor or logic circuit 211 using signals received from the absolute rotational position sensors 22A and 22B, once the initial absolute rotational position has been identified. Use of the vehicle wheel alignment sensor unit 200 is substantially identical to that embodiment 100 described above, but with a greater degree of precision in the absolute rotational position measurements.

In an alternate method of use, a vehicle wheel alignment sensor 100 or 200 of the present invention may be mounted to a conventional "no-compensation" type wheel adapter. A no-compensation wheel adapter, such as shown in U.S. Pat. No. 6,427,346 B1 to Stieff et al, herein incorporated by reference, is designed to facilitate attachment of a wheel alignment sensor unit 100, 200 to a vehicle wheel 10 without the need for any runout compensation. This type of wheel adapter operates on the assumption that the runout of the vehicle wheel is negligible, and that the manufacturing process of the wheel adapter itself does not induce any additional runout in the system, hence there is no need to rotate the vehicle wheel 10 or the wheel alignment sensor unit 100, 200 to different positions to compensate for runout within the system. These no-compensation wheel adapters are configured to minimize orientation errors. By configuring the wheel adapter to contact a vehicle wheel 10 (or other suspension component) in a reliable and repeatable manner, and by choosing points on the vehicle wheel 10 (or other suspension component) that provide a reference which closely represents that plane of rotation of the vehicle wheel 10, mounting errors incurred by the wheel adapter can be minimized. Careful fabrication of the wheel adapter itself to minimal tolerances minimizes any position and orientation errors between the mounting shaft 102, 202 and the wheel adapter, and the wheel adapter contact points on the vehicle wheel 10 (or other suspension component).

During mounting of the vehicle wheel alignment sensor unit 100, 200 to a no-compensation type wheel adapter, a technician is required to determine when the wheel alignment sensor unit 100, 200 is aligned with the scribed mark on the mounting shaft 102, 202 at the top-dead-center position, thereby mounting the wheel alignment sensor unit 100, 200 to the no-compensation adapter in a repeatable manner. By predetermination of an absolute rotational position of the mounting shaft 102, 202 relative to the vehicle wheel alignment sensor unit 100, 200 at the scribed mark, the logic circuit or micro-processor 110, 211 of the present invention may be configured to guide an operator with electronic guidance to correctly mount the wheel alignment sensor unit 100, 200 on a no-compensation type wheel adapter. Signals from the absolute rotational position sensor 22 identify to the micro-controller or logic circuit 110, 211 when the wheel alignment sensor unit 100 is rotational aligned to the desired position.

The micro-processor or logic circuit 110, 211 may be configured to provide LED illumination or a directional indication identifying the rotational position or direction to which the operator should rotate the wheel alignment sensor unit 100, 200 for mounting on the no-compensation type adapter at the top-dead-center or desired position.

The present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the micro-processor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for re-establishing runout compensation of a vehicle wheel alignment sensor unit having a mounting shaft operatively coupled to a vehicle wheel, comprising the steps of:

obtaining runout compensation data representative of runout present about a complete rotation of the mounting shaft relative to the vehicle wheel alignment sensor unit;

associating said runout compensation data with at least one absolute rotational position of the mounting shaft relative to the wheel alignment sensor unit;

storing said obtained runout compensation data and said associated absolute rotational position in a memory;

identifying a current absolute rotational position of the mounting shaft relative to the vehicle wheel alignment sensor unit; and comparing said current absolute rotational position with said stored associated absolute rotational position to identify at least one runout compensation value associated with a current rotation position of the mounting shaft relative to the vehicle wheel alignment sensor unit.

2. The method of claim 1 for re-establishing runout compensation of a vehicle wheel alignment sensor unit, wherein the step of identifying a current absolute rotational position of the mounting shaft relative to the vehicle wheel alignment sensor unit includes obtaining at least one representation of a magnetic field direction associated with a magnet operatively coupled to the mounting shaft; and comparing said obtained representation with a magnetic field direction of said magnet when said mounting shaft is disposed at a predetermined rotational position.

3. The method of claim 2 for re-establishing runout compensation of a vehicle wheel alignment sensor unit, wherein said step of obtaining at least one representation includes obtaining a sine value of said magnetic field direction and obtaining a cosine value of said magnetic field direction.

4. The method of claim 1 for re-establishing runout compensation of a vehicle wheel alignment sensor unit wherein the step of identifying a current absolute rotational position of the mounting shaft relative to the vehicle wheel alignment sensor unit includes acquiring a coarse rotational position measurement and a fine absolute rotational position measurement.

5. An improved vehicle wheel alignment sensor unit including a housing, a mounting shaft having an axis about which the housing is rotatably disposed, at least one angle sensor, and a micro-processor operatively coupled to the at least one angle sensor, the improvement comprising:

a magnet operatively coupled to the mounting shaft;

a first Hall Effect sensor disposed in proximity to said magnet, said first Hall Effect sensor configured to generate a first signal representative of an rotational position of said magnet about the axis of the mounting shaft;

a second Hall Effect sensor disposed in proximity to said magnet, said second Hall Effect sensor configured to generate a second signal representative of an rotational position of said magnet about the axis of the mounting shaft;

wherein said micro-processor is operatively coupled to said first and second Hall Effect sensors to receive said signals to identify an absolute rotational position of said magnet about the axis of the mounting shaft from said received first and second signals; and wherein said micro-processor is configured to utilize said identified absolute rotational position to identify a runout compensation value associated with said current rotational position.

6. An improved vehicle wheel alignment sensor unit including a housing, a mounting shaft having an axis about which the housing is rotatably disposed, at least one angle sensor, and a micro-processor operatively coupled to the at least one angle sensor, the improvement comprising:

a magnet operatively coupled to the mounting shaft;

a two-axis Hall Effect sensor disposed in proximity to said magnet, said two-axis Hall Effect sensor configured to generate a signal representative of an absolute rotational position of said magnet about the axis of the mounting shaft;

wherein said micro-processor is operatively coupled to said two-axis Hall Effect sensor to receive said signal; and wherein said micro-processor is configured to utilize said identified absolute rotational position, together with stored data representative of a sinusoidal runout pattern associated with an absolute rotational position of said magnet, to synchronize rotation of said mounting shaft about said axis with said sinusoidal runout pattern.

7. The improved vehicle wheel alignment sensor unit of claim 6 wherein said magnet is coaxially disposed on an end of the mounting shaft.

8. The improved vehicle wheel alignment sensor unit of claim 7 wherein said magnet is diametrically magnetized.

9. The improved vehicle wheel alignment sensor unit of claim 6 wherein said magnet is diametrically magnetized.

10. The improved vehicle wheel alignment sensor unit of claim 6 further including an annular magnet coaxially disposed about the mounting shaft, said annular magnet having at least two discrete pole pairs having equal arcuate dimensions;

a second Hall Effect sensor disposed coplanar with, and adjacent to, said annular magnet, said second Hall Effect sensor configured to generate at least one second signal representative of a rotational position of said annular magnet about the axis of the mounting shaft; and wherein said micro-processor is operatively coupled to said second Hall Effect sensor to receive said at least one second signal, said at least one signal identifying a discrete pole pair of said annular magnet in proximity to said second Hall Effect sensor, and said at least one second signal identifying an absolute rotational position of the mounting shaft within an arcuate range defined by said arcuate dimensions of said discrete pole pair.

11. The improved vehicle wheel alignment sensor unit of claim 12 wherein said second Hall Effect sensor is a two-axis Hall Effect sensor.

12. The improved vehicle wheel alignment sensor unit of claim 12 wherein said at least one signal is representative of a coarse absolute rotational position measurement, and wherein said at least one second signal is representative of a fine absolute rotational position measurement.

13. The method of claim 1 for re-establishing runout compensation of a vehicle wheel alignment sensor unit wherein said runout compensation data is representative of a sinusoidal runout pattern; and wherein said step of comparing said current absolute rotational position with said stored associated absolute rotational position further includes synchronizing said current absolute rotational position with said stored representation of said sinusoidal runout pattern.

14. An improved vehicle wheel alignment sensor unit including a housing, a mounting shaft having an axis about which the housing is rotatably disposed, at least one angle sensor, and a micro-processor operatively coupled to the at least one angle sensor, the improvement comprising:

a magnet operatively coupled to the mounting shaft;

a two-axis Hall Effect sensor disposed in proximity to said magnet, said two-axis Hall Effect sensor configured to generate a signal representative of an absolute rotational position of said magnet about the axis of the mounting shaft;

wherein said micro-processor is operatively coupled to said two-axis Hall Effect sensor to receive said signal; and wherein said micro-processor is further configured to compare said identified absolute rotational position with at least one selected rotational position of the mounting shaft relative to the housing to identify when the sensor unit is rotationally disposed at said selected rotational position.

15. A method for facilitating mounting of a vehicle wheel alignment sensor unit relative to a mounting shaft on a no-compensation wheel adapter, comprising:

identifying an absolute rotational position of the mounting shaft relative to the vehicle wheel alignment sensor unit; and comparing said identified absolute rotational position with at least one predetermined rotational position of the mounting shaft relative to the vehicle wheel alignment sensor unit to identify when the sensor unit is rotationally disposed at a selected rotational position.

16. The method of claim 15 for facilitating mounting a vehicle wheel alignment sensor unit relative to a mounting shaft on a no-compensation wheel adapter wherein said predetermined rotational position corresponds to a top-dead-center rotational position of the mounting shaft relative to the vehicle wheel alignment sensor unit.

17. The method of claim 15 for facilitating mounting a vehicle wheel alignment sensor unit relative to a mounting shaft on a no-compensation wheel adapter wherein the step of identifying a current absolute rotational position of the mounting shaft relative to the vehicle wheel alignment sensor unit includes obtaining at least one representation of a magnetic field direction associated with a magnet operatively coupled to the mounting shaft; and comparing said obtained representation with a magnetic field direction of said magnet when said mounting shaft is disposed at a predetermined rotational position.

18. The method of claim 17 for facilitating mounting a vehicle wheel alignment sensor unit relative to a mounting shaft on a no-compensation wheel adapter wherein said step of obtaining at least one representation includes obtaining a sine value of said magnetic field direction and obtaining a cosine value of said magnetic field direction.

19. The method of claim 15 further including the step of guiding an operator to rotationally align said vehicle wheel alignment sensor unit with said predetermined rotational position.

* * * * *